May 20, 1958  E. B. HAMILTON  2,835,392
FILTER FUNNEL
Filed April 4, 1955

Eugene B. Hamilton
INVENTOR.

United States Patent Office 2,835,392
Patented May 20, 1958

2,835,392

FILTER FUNNEL

Eugene B. Hamilton, Lexington, Mass.

Application April 4, 1955, Serial No. 498,884

1 Claim. (Cl. 210—477)

The present invention relates to new and useful improvements in funnels, and more particularly to a filter structure for the funnel.

An important object of the invention is to equip the funnel with a filter which is easily removable for purposes of cleaning or replacing the filtering element.

Another object is to provide a funnel constructed with a filter chamber having an inturned shoulder on which a filter unit is removably supported and blocked against seepage of unfiltered liquid at the edges of the filter.

A further object is to construct a filter funnel for use in filling the fuel tank of motor boats, motor vehicles, airplanes and storage tanks and providing the chamber with a flat base to rest on the fuel tank and with a spout extending downwardly from the flat base to enter the filler opening of the tank serving to maintain the funnel in an upright position while in use.

An additional object of this invention is to construct a filter funnel for use in filtering the many acids and alkalis used by chemical manufacturers and laboratories.

A still further object is to provide a device of this character of simple and practical construction, which is relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
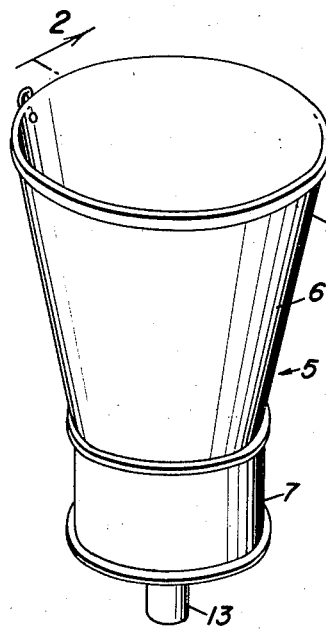
Figure 1 is a perspective view.
Figure 2:
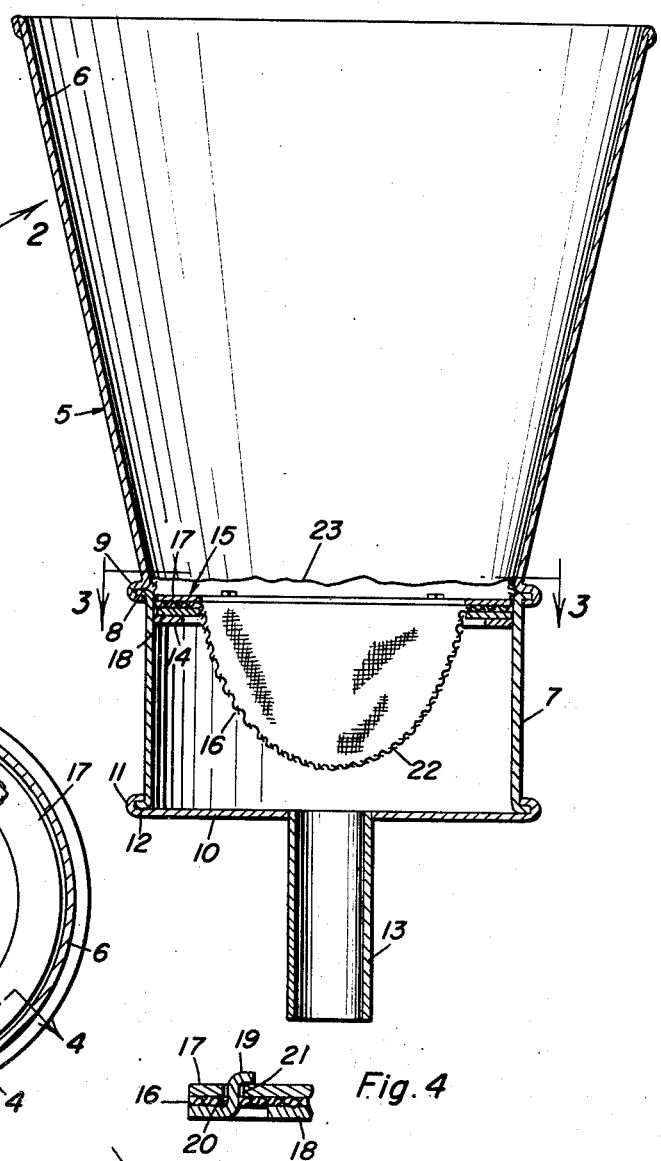
Figure 2 is an enlarged vertical sectional view taken on a line 2—2 of Figure 1.
Figure 3:
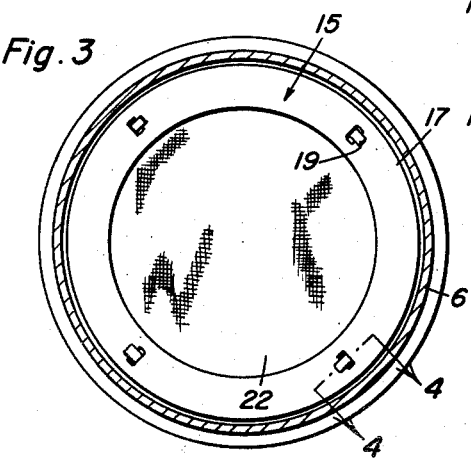
Figure 3 is a transverse sectional view taken on a line 3—3 of Figure 2.
Figure 4:
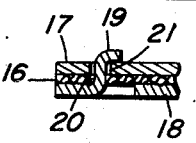
Figure 4 is an enlarged fragmentary sectional view taken on a line 4—4 of Figure 3 and showing the locking tongue for the filter clamping rings.
Figure 5:
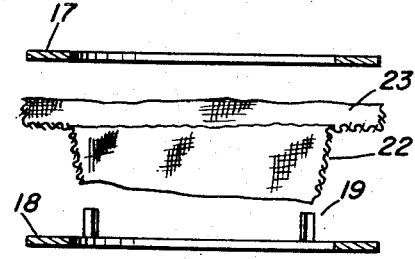
Figure 5 is a group fragmentary sectional view of the clamping rings and filter element.

Referring now to the drawing in detail, wherein for the purpose of illustration, I have disclosed a preferred embodiment of my invention, the numeral 5 designates the funnel generally and which is constructed with an upwardly flaring mouth portion 6 and a cylindrical filter chamber 7 secured to the lower portion of the mouth by an outwardly projecting flange 8 on the chamber interlockably engaged in an annular channel 9 on the mouth and crimped to seal the chamber therewith.

A flat bottom 10 of disk-shape is also formed with an annular channel 11 at its edge portion crimped and sealed over an outwardly projecting flange 12 at the lower portion of the chamber. A spout 13 projects downwardly at the center of the bottom 10.

The upper portion of chamber 7 is formed with an internal annular shoulder or shelf 14 on which a filter unit, designated generally at 15, is supported. The filter unit includes a chamois or other suitable filtering element 16 which is clamped adjacent its edge portions between upper and lower clamping rings 17 and 18 and with the lower ring formed with upwardly projecting bendable tongues 19 which pass upwardly through openings 20 in the filtering element and are lockably engaged in openings 21 in the upper ring.

The clamping ring of the filter is adapted to rest on the shoulder 14 in chamber 7, while the center of the filtering element forms a receptacle 22 to extend downwardly in the chamber. The clamping rings are of a width slightly greater than the width of the shoulder 14 on which the filter unit 15 is supported to facilitate removal of the filter unit for cleaning or replacement.

The marginal edges of the filtering element extend outwardly beyond the clamping rings, as shown at 23, for sealing the ring at the inside of the chamber 7.

The spout 13 may be placed in a filter opening of a fuel tank (not shown) or other container and with the flat bottom 10 of filter chamber 7 resting on top of the tank to prevent the funnel from tilting while being used to fill the tank.

The filtering unit may be easily removed from the chamber 7 to permit cleaning of the filtering element and the clamping rings may be separated from each other to replace the filtering element, when desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A filter comprising a cylindrical chamber having an open upper end attachable to the lower portion of an upwardly flaring mouth portion, an annular flat flange in the upper portion of said chamber, a pair of upper and lower flat rings fitting in said chamber above said flange with the lower ring seated on said flange, a flexible filtering element depending through the lower ring and said flange into the chamber and having a marginal edge lying between said wings, said upper ring having circumferentially spaced openings therein and said lower ring having bendable tongues thereon extending through the marginal edge of said element and through said openings and bent downwardly against the upper ring whereby to lockably clamp the marginal edge of said element between said rings, said flange being internally larger than said rings to facilitate extending the element through said flange.

References Cited in the file of this patent

UNITED STATES PATENTS

| | | |
|---|---|---|
| 170,167 | Garrison | Nov. 23, 1875 |
| 418,719 | Hepburn | Jan. 7, 1890 |
| 871,285 | Martin | Nov. 19, 1907 |
| 1,041,331 | Nelson | Oct. 15, 1912 |
| 1,041,378 | Tweeddale | Oct. 15, 1912 |
| 1,620,083 | de Stubner | Mar. 8, 1927 |
| 2,070,998 | Odom | Feb. 16, 1937 |
| 2,453,354 | Zabel | Nov. 9, 1948 |

FOREIGN PATENTS

| | | |
|---|---|---|
| 476,632 | France | Aug. 19, 1915 |